United States Patent
Wilkins

[11] Patent Number: 5,971,133
[45] Date of Patent: Oct. 26, 1999

[54] CONVEYOR ASSEMBLY INCORPORATING A POP-UP SWIVEL WHEEL DIVERTER

[75] Inventor: John J. Wilkins, Cincinnati, Ohio

[73] Assignee: HK Systems, Inc., New Berlin, Wis.

[21] Appl. No.: 08/853,340

[22] Filed: May 8, 1997

[51] Int. Cl.$^6$ .................................................. B65G 47/46
[52] U.S. Cl. ....................................................... 198/370.09
[58] Field of Search ........................... 198/370.01, 370.09

[56] References Cited

U.S. PATENT DOCUMENTS

| | | | |
|---|---|---|---|
| 3,036,691 | 5/1962 | Byrnes | 198/20 |
| 3,058,565 | 10/1962 | Byrnes | 193/36 |
| 3,138,238 | 6/1964 | DeGood et al. | 198/127 |
| 3,592,325 | 7/1971 | Sullivan et al. | 198/31 |
| 3,768,630 | 10/1973 | Inwood et al. | 198/127 |
| 3,983,988 | 10/1976 | Maxted et al. | 198/365 |
| 4,189,273 | 2/1980 | Soderstrom et al. | 414/285 |
| 4,328,889 | 5/1982 | Maxted | 198/367 |
| 4,372,435 | 2/1983 | Bradbury | 198/356 |
| 4,598,815 | 7/1986 | Adama | 198/372 |
| 4,696,386 | 9/1987 | Lem | 198/372 |
| 4,703,844 | 11/1987 | Jahns | 198/367 |
| 4,746,003 | 5/1988 | Yu et al. | 198/367 |
| 4,792,034 | 12/1988 | Leemkuil | 198/372 |
| 4,962,841 | 10/1990 | Kloosterhouse | 198/370.09 |
| 5,012,914 | 5/1991 | Berends et al. | 198/372 |
| 5,029,693 | 7/1991 | Williams | 198/372 |
| 5,275,272 | 1/1994 | Ydoate | 198/367 |
| 5,415,266 | 5/1995 | van der Werff | 198/370.09 |
| 5,427,223 | 6/1995 | van den Goor | 198/365 |
| 5,435,429 | 7/1995 | Van Den Goor | 198/890.1 |

*Primary Examiner*—James R. Bidwell
*Attorney, Agent, or Firm*—Nilles & Nilles, S.C.

[57] ABSTRACT

A diverter is capable of selectively and alternatively operating in an in-line mode in which it conveys articles along a primary conveyor and in a diverting mode in which it swivels and pops-up to smoothly ramp articles vertically from the primary conveyor and to divert the articles at an angle from the primary conveyor and onto a secondary conveyor or the like. In addition to popping-up and swiveling, the diverter helps to turn the diverted article onto the secondary conveyor by conveying one side of the article faster than the other side. The diverter includes a plurality of laterally spaced diverter wheel assemblies each of which can be swiveled from an in-line orientation to a skewed orientation. The outer peripheral surfaces of the diverter wheels run at the primary conveyor's in-line speed when the diverter wheels are in their in-line orientation and change speeds when the diverter wheels swivel to their skewed orientation so that their speeds increase progressively from wheel-to-wheel as one moves laterally across the diverter to create a speed differential across the primary conveyor. Speed changeover is effected via a multi-grooved spool coupled to the diverter wheel by an O-ring belt. Diverter wheel swiveling causes the belt to twist and to traverse a generally helical or flattened-S-shaped crossover groove forward in a flange separating the adjacent pulley grooves of the spool. The spools and diverter wheel assemblies move together during a pop-up operation to reduce belt stretching.

38 Claims, 10 Drawing Sheets

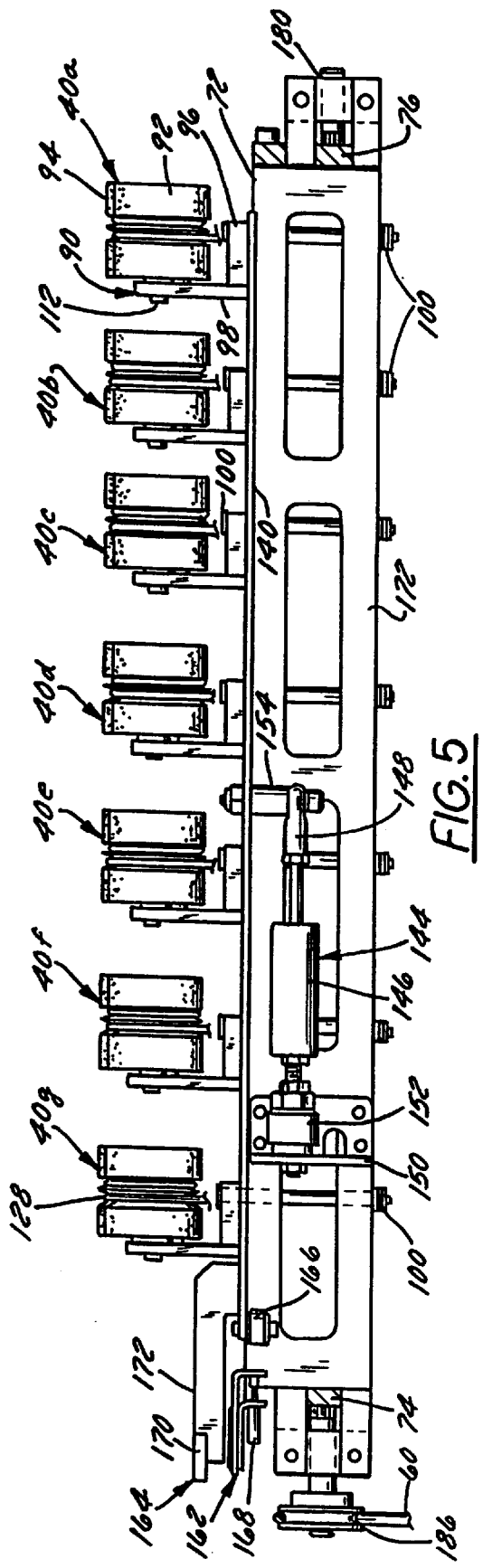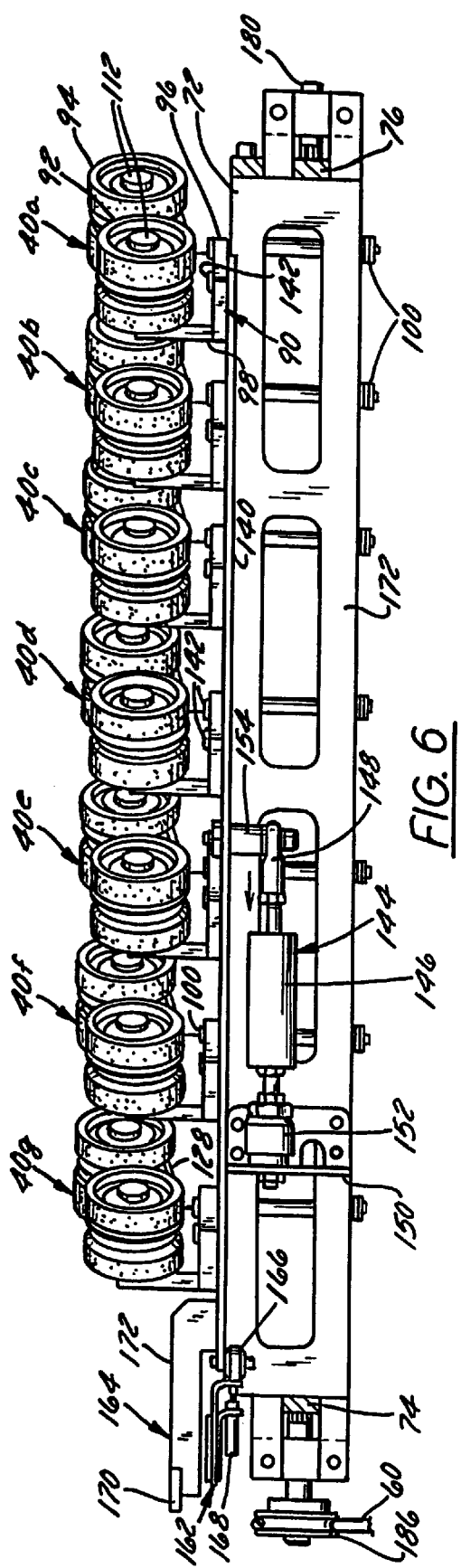

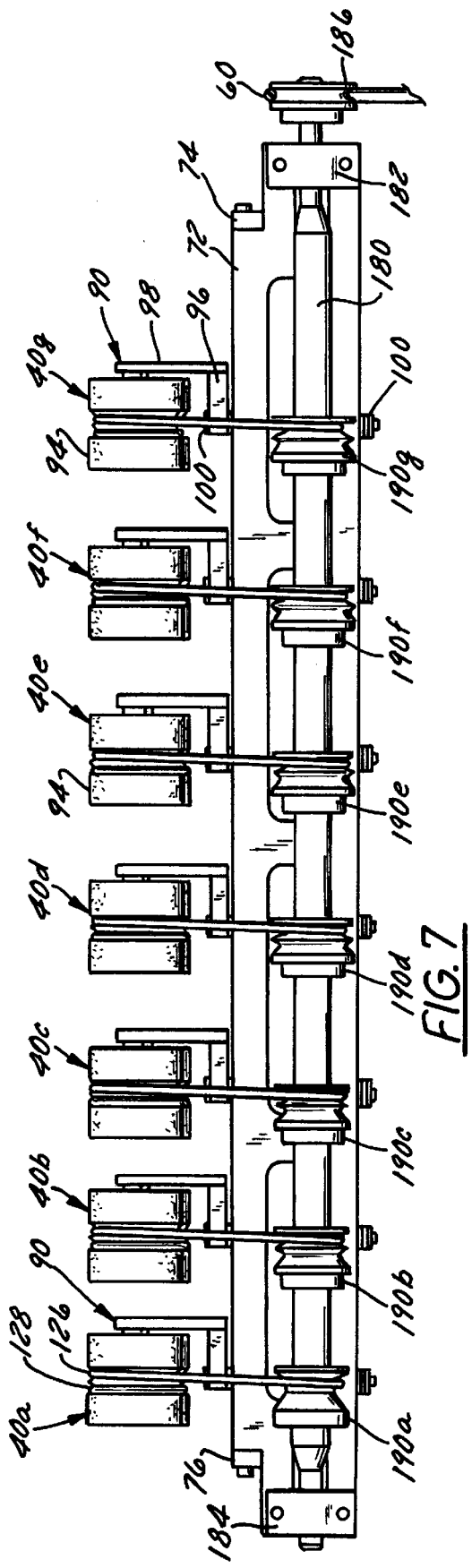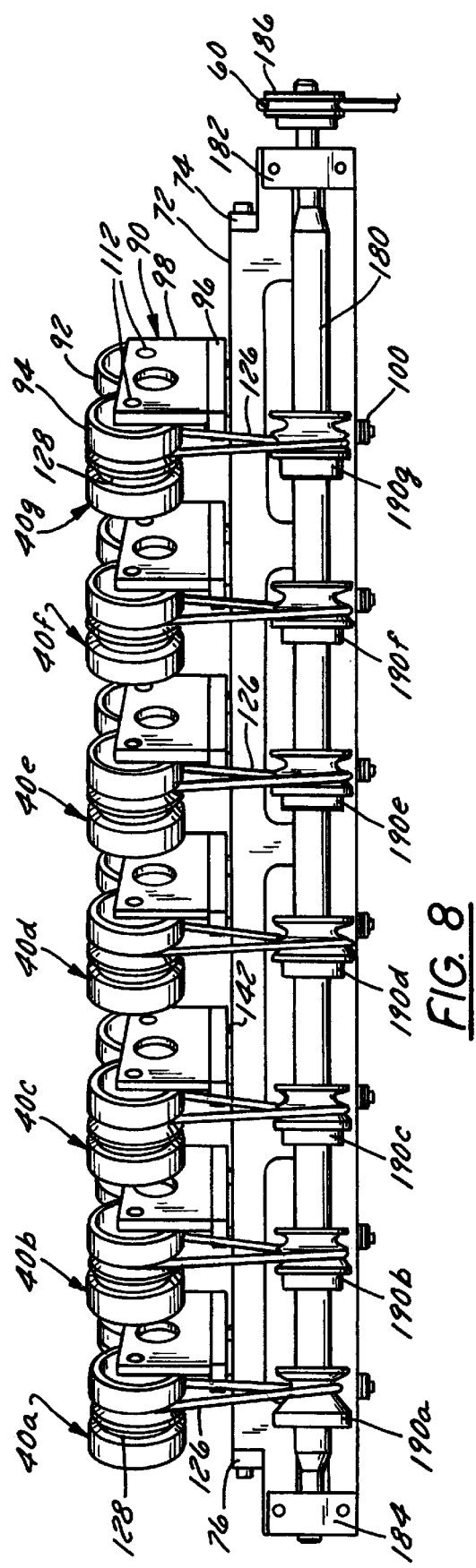

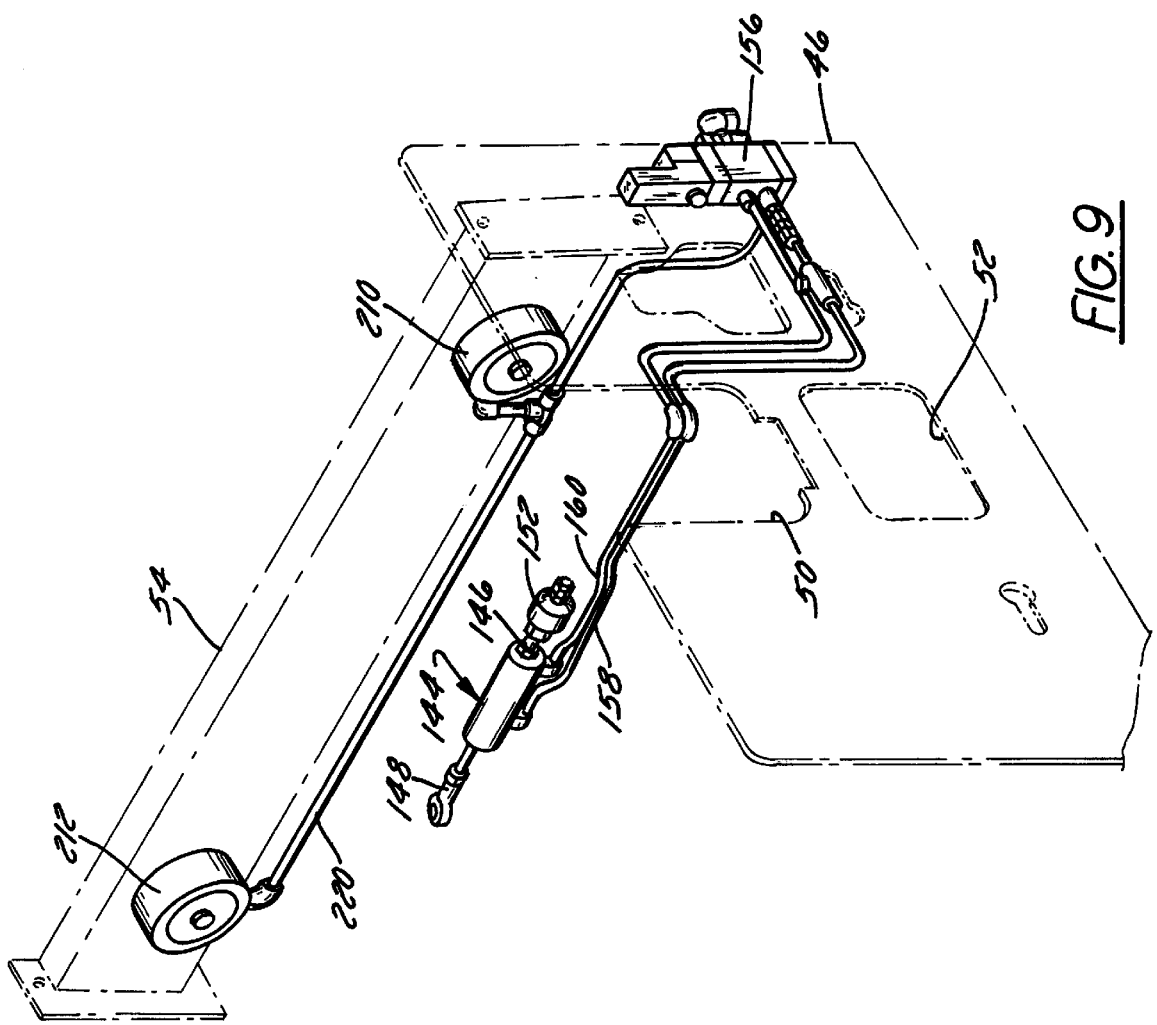

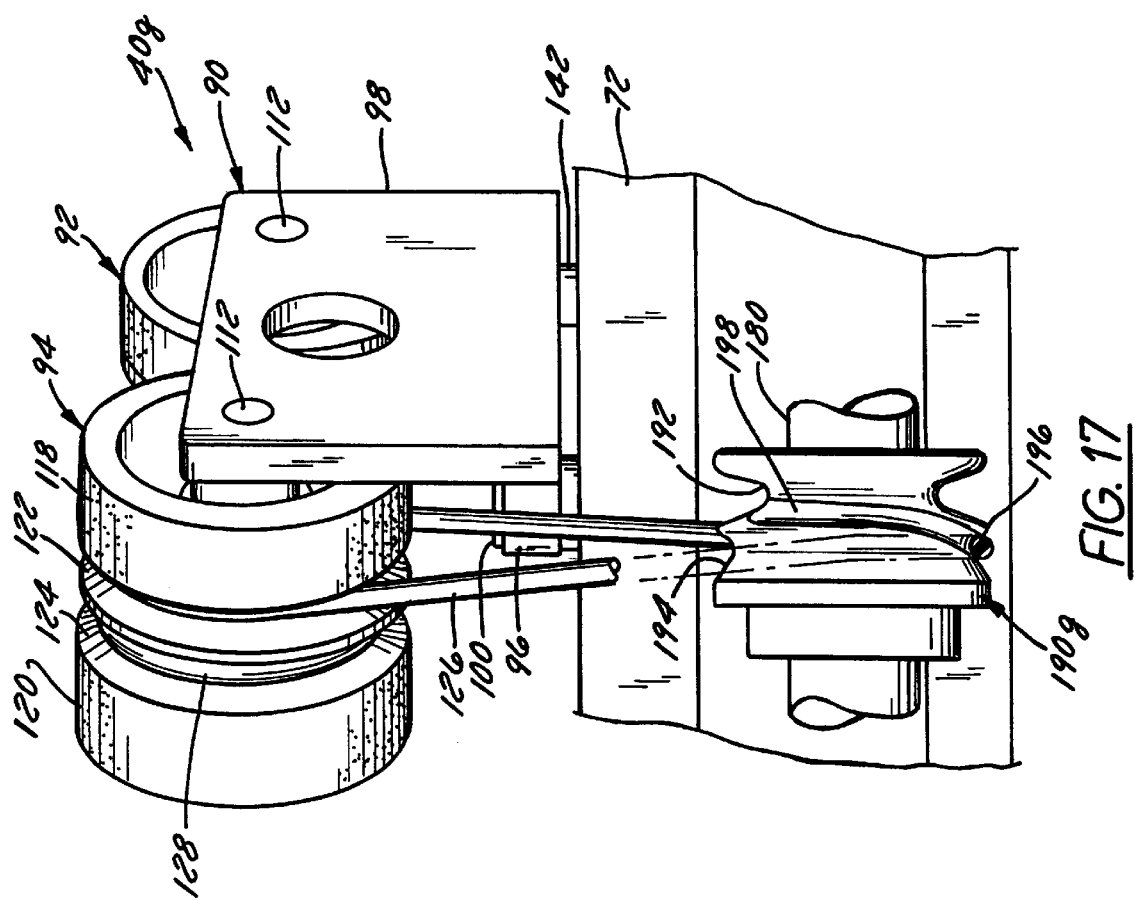
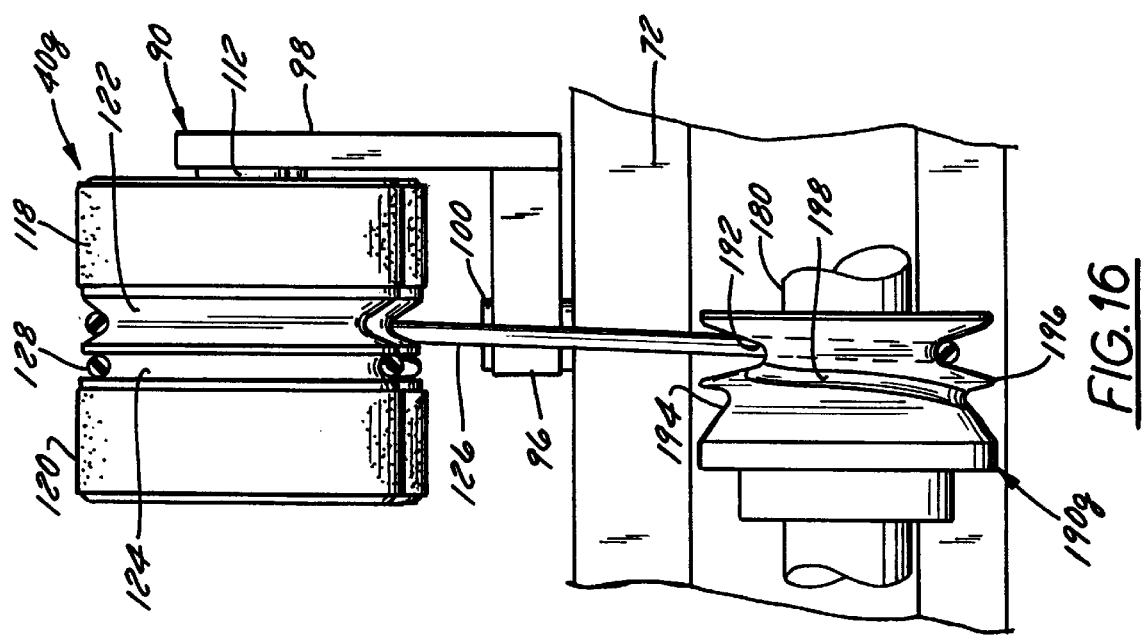

CONVEYOR ASSEMBLY INCORPORATING A POP-UP SWIVEL WHEEL DIVERTER

BACKGROUND OF THE INVENTION

1. Field of the Invention

The invention relates to conveyor assemblies and, more particularly, relates to a conveyor assembly that includes a swivel wheel diverter for selectively diverting conveyed articles at an angle from a conveyor. The invention relates additionally to an improved diverter wheel assembly usable in a diverter and to an improved method of diverting articles from a conveyor.

2. Discussion of the Related Art

It is necessary in many conveying applications to selectively and alternatively 1) convey articles along a conveyor in an initial conveying path or direction (generally known as "in-line" conveyance) and 2) divert articles from the conveyor and onto another conveyor, a sort location, a spur line, etc. Selectively operable apparatus usable for this purpose are generally known in the art as "diverters."

One type of diverter used in a variety of applications and particular in high-speed applications is the so-called wheel diverter that uses a series of rotating diverter wheels to direct articles. The diverter wheels of traditional wheel diverters at least selectively rotate at an angle to the in-line direction of conveyance of the primary conveyor in which the diverter is disposed and are positioned between adjacent primary conveyor sections (or, in the case of a roller conveyor, between adjacent rollers) so as to selectively engage and divert articles travelling along the conveyor. To effect a divert operation, the diverter wheels of a diverter may swivel, pop-up, or both swivel and pop-up.

In diverters in which the diverter wheels pop-up, the diverter wheels are normally positioned beneath the primary conveyor's plane of conveyance. These wheels are permanently skewed and hence cannot rotate in-line with the associated primary conveyor. To effect a divert operation, the skewed wheels are driven upwardly so that they "pop-up" into the plane of conveyance to convey articles away from the primary conveyor. Diverters of this type are disclosed in U.S. Pat. No. 3,138,238 to Good et al.; U.S. Pat. No. 3,983,988 to Maxted et al.; and U.S. Pat. No. 4,328,889 to Maxted.

Other diverters incorporate diverter wheels that can swivel but do not pop-up, at least on a cycle-to-cycle basis, but that instead swivel between an in-line orientation and a skewed orientation in which they rotate at least generally towards a secondary conveyor or some other device extending at an angle from the primary conveyor. A diverter of this type is disclosed in U.S. Pat. No. 5,117,961 to Nicholson.

Still other diverters incorporate diverter wheels that both pop-up and swivel. The diverter wheels of these diverters can be swiveled from an in-line orientation in which they help convey articles along the primary conveyor to a skewed orientation in which they convey articles at an angle from the primary conveyor. The diverter wheels pop-up as they swivel so that they may facilitate a diverting operation by lifting the article from the primary conveyor and positioning it for transfer to a secondary conveyor or another structure that may be located above the plane of conveyance of the primary conveyor. Lifting the article from the primary conveyor prevents the adjacent portions of the primary conveyor from acting on the article and hence prevents the diverted articles from being pulled in two directions at once. Diverters having diverter wheels that both pop-up and swivel are disclosed in U.S. Pat. No. 4,598,815 to Adama; U.S. Pat. No. 4,703,844 to Jahns; and U.S. Pat. No. 5,029,693 to Williams.

The rotational speed of the diverter wheels of the diverters disclosed in several of the above-mentioned patents are controlled to be different from the in-line speed of the primary conveyor. For instance, the diverter wheels disclosed in the Maxted '988 and Nicholson patents rotate faster than the in-line speed of the primary conveyor to accelerate articles being diverted to maintain a desired spacing between diverted articles. The diverter wheels disclosed in the Berends patent are somewhat more sophisticated in that the diverter wheels are accelerated only during a diverting operation so that they convey articles at generally the in-line speed of the primary conveyor when in their in-line orientation and accelerate articles when in their skewed orientation. The increased speed of the skewed diverter wheels is said to allow the articles to be diverted abruptly from the main or primary conveyor without interference from either the previously-diverted articles or the upstream articles. Diverter wheel acceleration is effected by driving each wheel directly via a drive shaft that rides up a curved surface of a spool upon wheel swiveling to increase the rotational velocity of the shaft and hence the rotational velocity of the wheel.

Previously-known wheel diverters of the type described above exhibit several drawbacks and disadvantages.

For instance, none of the diverters described above is capable of changing the rotational speeds of diverter wheels between two distinct, pre-settable speeds upon diverter wheel swiveling. Interaction between the curved spool surface and the drive shaft of each diverter wheel described in the Berends patent instead causes the rotational velocity of the diverter wheel to vary progressively as the wheel swivels and its shaft rides up the curved surface of the associated spool. In addition, the direct contact between the drive shaft and the spool in Berends' diverter may result in accelerated wear of both components.

In addition, none of the prior art diverters, including that disclosed by Berends, controls the rotational velocities of the diverted wheels such that the velocity of the wheels increases progressively from wheel-to-wheel as one travels laterally across the primary conveyor. Rather, all diverter wheels rotate at the same velocity when in their diverted position. As a result, article diverting is effected solely via diverter wheel skewing. There is no change of speed across the width of the article that otherwise could assist article diverting by turning the article towards the secondary conveyor.

In addition, in those prior art diverters in which the diverter wheel is driven by an O-ring or some other type of belt (generally considered to be the most cost effective and efficient manner of driving a diverter wheel) and in which the diverter wheels both swivel and pop-up, the belt stretches twice. It stretches first as the diverter wheel swivels due to the change in angular orientation between the driven diverter wheel and the pulley or spool which drives it. It stretches again during the pop-up operation because the vertical spacing between the rising diverter wheel and the vertically-stationary drive pulley increases. This two-stage stretching (both stages of which may take place simultaneously if the swivel and pop-up operations occur simultaneously) may lead to premature wear and early failure of the driven belt.

Moreover, no known pop-up diverter smoothly ramps the diverted articles upwardly from the surface of the primary conveyor. The diverted articles instead are lifted rather abruptly by the elevated diverter wheels.

OBJECTS AND SUMMARY OF THE INVENTION

A first object of the invention therefore is to provide a conveyor assembly including a conveyor and a diverter that includes 1) a plurality of laterally-spaced diverter wheels movable between an in-line orientation and a skewed or diverting orientation and that may additionally pop-up and 2) a speed change mechanism that drives the diverter wheels to rotate at essentially the same velocity when the wheels are in their in-line orientation and that varies the velocity of at least some of the diverter wheels when the wheels are in their skewed orientation so that the wheels help turn the diverted articles away from the conveyor.

In accordance with a first aspect of the invention, this object is achieved by providing A) a conveyor having inner and outer lateral sides, and B) a diverter for selectively 1) permitting articles to travel along the conveyor without being diverted from the conveyor and 2) diverting articles away from the inner lateral side of the conveyor at an angle. The diverter includes a plurality of diverter wheel assemblies and a speed change mechanism. The diverter wheel assemblies are: spaced laterally across the conveyor, each of the diverter wheel assemblies including at least one driven diverter wheel which is capable of swiveling a) from an in-line orientation in which a rotational axis thereof is generally perpendicular to a direction of conveyance of the conveyor b) to a skewed orientation in which the rotational axis thereof is not generally perpendicular to a direction of conveyance of the conveyor and in which the diverter wheel conveys articles away from the inner lateral side of the conveyor at an angle. The speed change mechanism causes the rotational velocities of at least some of the diverter wheels to vary upon diverter wheel swiveling so that a second diverter wheel positioned laterally outside of a first diverter wheel rotates at generally the same velocity as the first diverter wheel when the first and second diverter wheels are in the in-line orientation thereof and so that the second diverter wheel rotates faster than the first diverter wheel when the first and second diverter wheels are in the skewed orientation thereof. This speed change may if desired continue progressively across the width of the conveyor.

Preferably, the speed change mechanism is designed to achieve rapid speed changeover using a simple and reliable structure that can accommodate driven belts of the type commonly used to drive diverter wheels. The speed change mechanism therefore preferably comprises first and second driven spools which are coupled to the first and second diverter wheels by first and second driven belts, respectively. Each of the spools can have first and second side-by-side pulley grooves, the first pulley grooves of the first and second spools being of essentially equal diameter and the second pulley groove of the second spool being of a larger diameter than a diameter of the second pulley groove of the first spool. The first and second driven belts each ride in the associated first pulley groove when the associated diverter wheel is in the in-line orientation thereof and in the associated second pulley groove when the associated diverter wheel is in the skewed orientation thereof. Each of the spools also preferably comprises a transition mechanism which causes the associated driven belt to transfer completely from the first pulley groove to the second pulley groove upon swiveling of the associated diverter wheel such that the transfer is completed in no more than one revolution of the spool.

Another object of the invention is to reduce the amount that any one belt of a diverter stretches as the diverter wheels of the diverter move from a lowered, in-line orientation to a popped-up, skewed orientation.

In accordance with another aspect of the invention, this object is achieved by mounting the diverter wheel assemblies and the drive arrangement for those assemblies on a common carriage that in turn is movably mounted on a stationary frame. Specifically, a drive pulley is rotatably mounted on the stationary frame. A diverter wheel assembly is mounted on the carriage for swiveling motion and rotational motion with respect to the carriage. A diverter wheel drive assembly is mounted on the carriage. A driven belt couples the diverter wheel drive assembly to the diverter wheel assembly and stretches as a result of diverter wheel assembly swiveling but not as a result of carriage movement. A drive belt couples the drive pulley to the diverter wheel drive assembly and stretches as a result of carriage movement but not as a result of diverter wheel assembly swiveling.

Preferably, the diverter wheel assembly comprises a bracket mounted on the carriage for swiveling movement with respect to the carriage, and a diverter wheel rotatably mounted on the bracket. In this embodiment, the diverter wheel drive assembly comprises a driven shaft rotatably mounted on the carriage, a driven pulley fixedly mounted on the driven shaft and coupled to the drive pulley by the drive belt, and a driven spool fixedly mounted on the driven shaft and coupled to the diverter wheel by the driven belt.

Yet another object of the invention is to provide an improved diverter wheel assembly including a driven diverter wheel and a speed change mechanism designed to effect precise and rapid changeover between first and second distinct diverter wheel rotational velocities.

In accordance with another aspect of the invention, the speed change mechanism includes a spool which transmits torque to the respective diverter wheel through a driven belt. The spool has first and second distinct pulley grooves, the second pulley groove being of a larger diameter than the first pulley groove. The driven belt rides in the first pulley groove when the diverter wheel is in the in-line orientation thereof and in the second pulley groove when the diverter wheel is in the skewed orientation thereof. The spool preferably further comprises a transition mechanism which causes the driven belt to transfer completely from the first pulley groove to the second pulley groove upon swiveling of the diverter wheel, and wherein the transfer is completed in no more than one revolution of the spool. The transition mechanism may comprise a cross-over groove formed in a flange separating the first and second pulley grooves.

Yet another object of the invention is to provide an improved method of selectively diverting articles from a conveyor.

In accordance with yet another aspect of the invention, this object is achieved by conveying a first article along the first conveyor without diverting the article onto the second conveyor by engaging a surface of the first article with the diverter wheels, the diverter wheels 1) being in an in-line orientation in which the diverter wheels each rotate about an axis that is essentially perpendicular to a direction of conveyance of the first conveyor, and 2) all rotating at essentially the same velocity. The diverter wheels are then swiveled to place the diverter wheels in a skewed orientation in which the diverter wheels each rotate about an axis that is not essentially perpendicular to the direction of conveyance of the first conveyor, and the rotational velocities of at least some of the diverter wheels are varied. Then, while the diverter wheels are in their skewed orientation, a second article is diverted from the first conveyor to the second conveyor under power of the diverter wheels. A velocity differential amongst the diverter wheels helps turn the second article so that an outer lateral portion of the second article is conveyed faster than an inner lateral portion of the second article as the second article is diverted onto the second conveyor.

Still another object of the invention is to provide an improved method of varying the speed of a diverter wheel.

In accordance with still another aspect of the invention, this object is achieved by swiveling the diverter wheel to twist the belt such that belt twisting causes the belt to transfer from a first pulley groove of the spool to a second distinct pulley groove of the spool which has a different diameter than a diameter of the first pulley groove. Preferably, the belt transfers completely from the first pulley groove to the second pulley groove in no more than one revolution of the spool. Belt transfer is facilitated by a cross-over groove formed in a flange separating the first and second pulley grooves, the cross-over groove being generally in the shape of a partially-flattened S when viewed in front elevation.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIGS. 5 and 6 are rear end elevation views of a carriage of the diverter, illustrating the diverter wheel assemblies of the diverter in an in-line orientation and a skewed orientation, respectively;

FIGS. 7 and 8 are front end elevation views of the carriage and associated components, illustrating the diverter wheel assemblies in an in-line orientation and a skewed orientation, respectively;

FIG. 9 is a partially-phantom perspective view illustrating the cooperation between pivot and swivel cylinders of the diverter and some of the remaining diverter components;

FIGS. 16 and 17 illustrate changeover of a driven belt of the diverter during a diverter wheel assembly swiveling operation.

DETAILED DESCRIPTION OF THE PREFERRED EMBODIMENTS

1. Resume

Pursuant to the invention, a diverter is capable of selectively and alternatively operating in an in-line mode in which it conveys articles along a primary conveyor and in a diverting mode in which it swivels and pops-up to smoothly ramp articles vertically from the primary conveyor and to divert the articles at an angle from the primary conveyor and onto a secondary conveyor or the like. In addition to popping-up and swiveling, the diverter helps to turn the diverted article onto the secondary conveyor by conveying one side of the article faster than the other side. The diverter includes a plurality of laterally spaced diverter wheel assemblies each of which can be swiveled from an in-line orientation to a skewed orientation. The outer peripheral surfaces of the diverter wheels run at the primary conveyor's in-line speed when the diverter wheels are in their in-line orientation and change speeds when the diverter wheels swivel to their skewed orientation so that their speeds increase progressively from wheel-to-wheel as one moves laterally across the diverter to create a speed differential across the primary conveyor. Speed changeover is affected via a multi-grooved spool coupled to the diverter wheel by an O-ring belt. Diverter wheel swiveling causes the belt to twist and to traverse a generally helical or flattened-S-shaped crossover groove forward in a flange separating the adjacent pulley grooves of the spool. The spools and diverter wheel assemblies move together during a pop-up operation to reduce belt stretching.

2. System Overview

Figure 1:
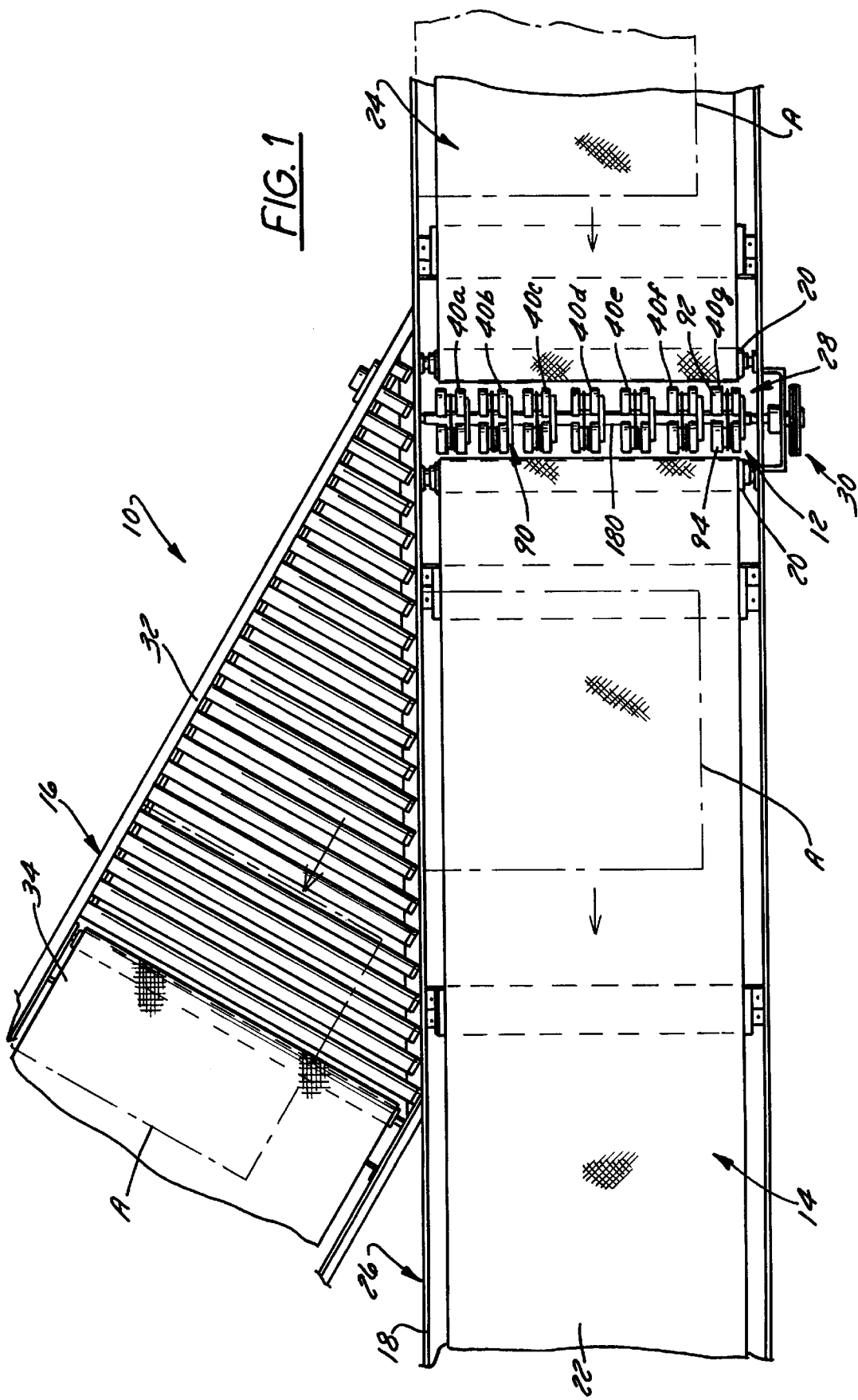
FIG. 1 is a top plan view of a conveyor assembly incorporating a diverter constructed in accordance with a preferred embodiment of the invention.

Referring to the drawings and initially to FIG. 1 by way of illustration, a conveyor assembly 10 is illustrated that incorporates a diverter 12 constructed in accordance with a preferred embodiment of the present invention. The conveyor assembly 10 includes a first or primary conveyor 14 and a second or secondary conveyor 16 that extends at an angle from an inner lateral side of the primary conveyor 14. The diverter 12 alternatively and selectively 1) helps convey articles A in-line along the primary conveyor 14 without diverting those articles onto the secondary conveyor 16, and 2) diverts articles A from the primary conveyor 14 and onto the secondary conveyor 16. Only a single secondary conveyor 16 is illustrated. The inventive diverter 12 could, however, be used to also selectively divert articles onto a third conveyor (not shown), located adjacent the opposite or outer lateral side of the primary conveyor 14.

Figure 2:
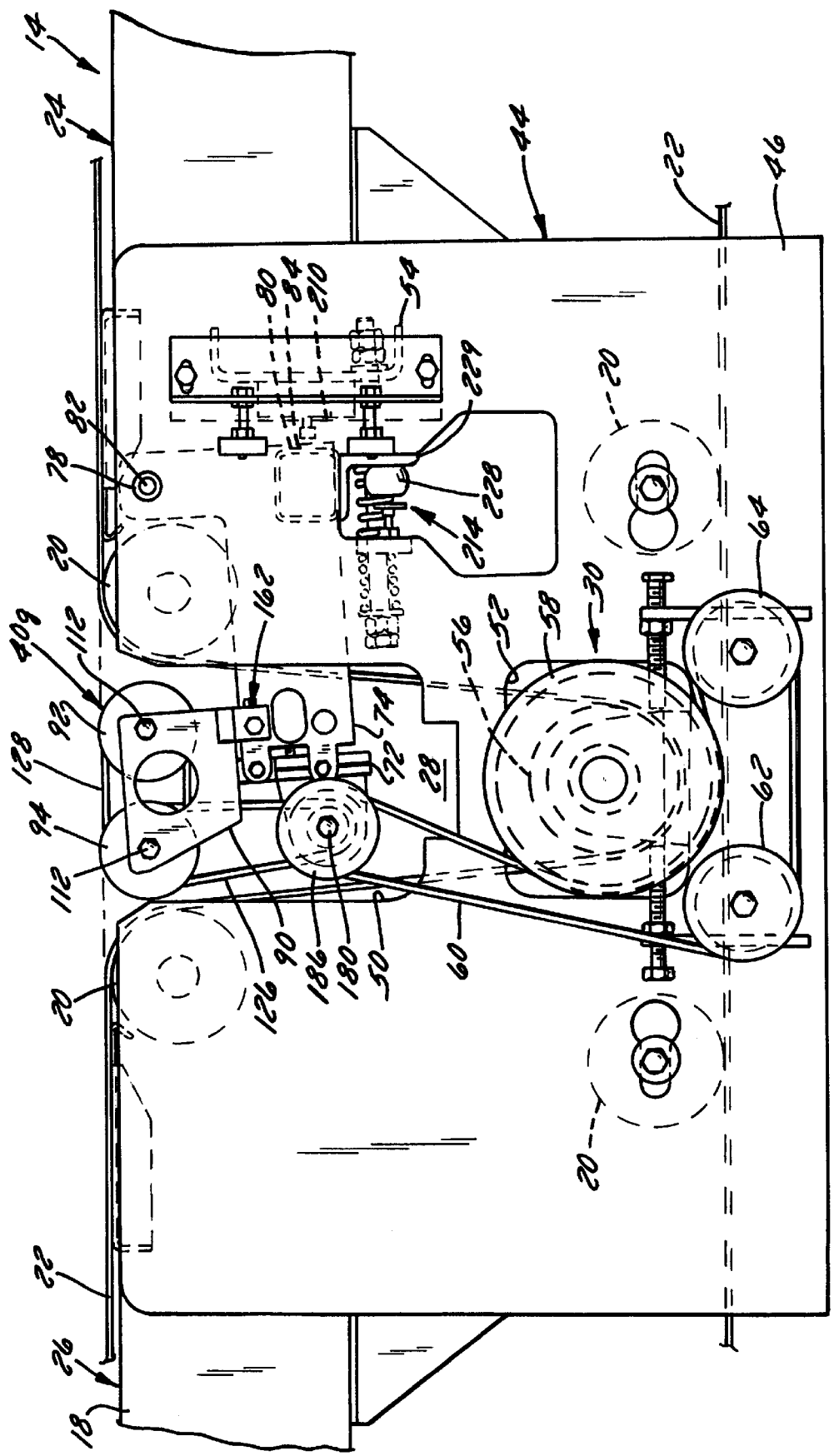
FIG. 2 is a side elevation view of a portion of the conveyor assembly of FIG. 1 that includes the diverter, and illustrating a carriage of the diverter in its lowered position.
Figure 3:
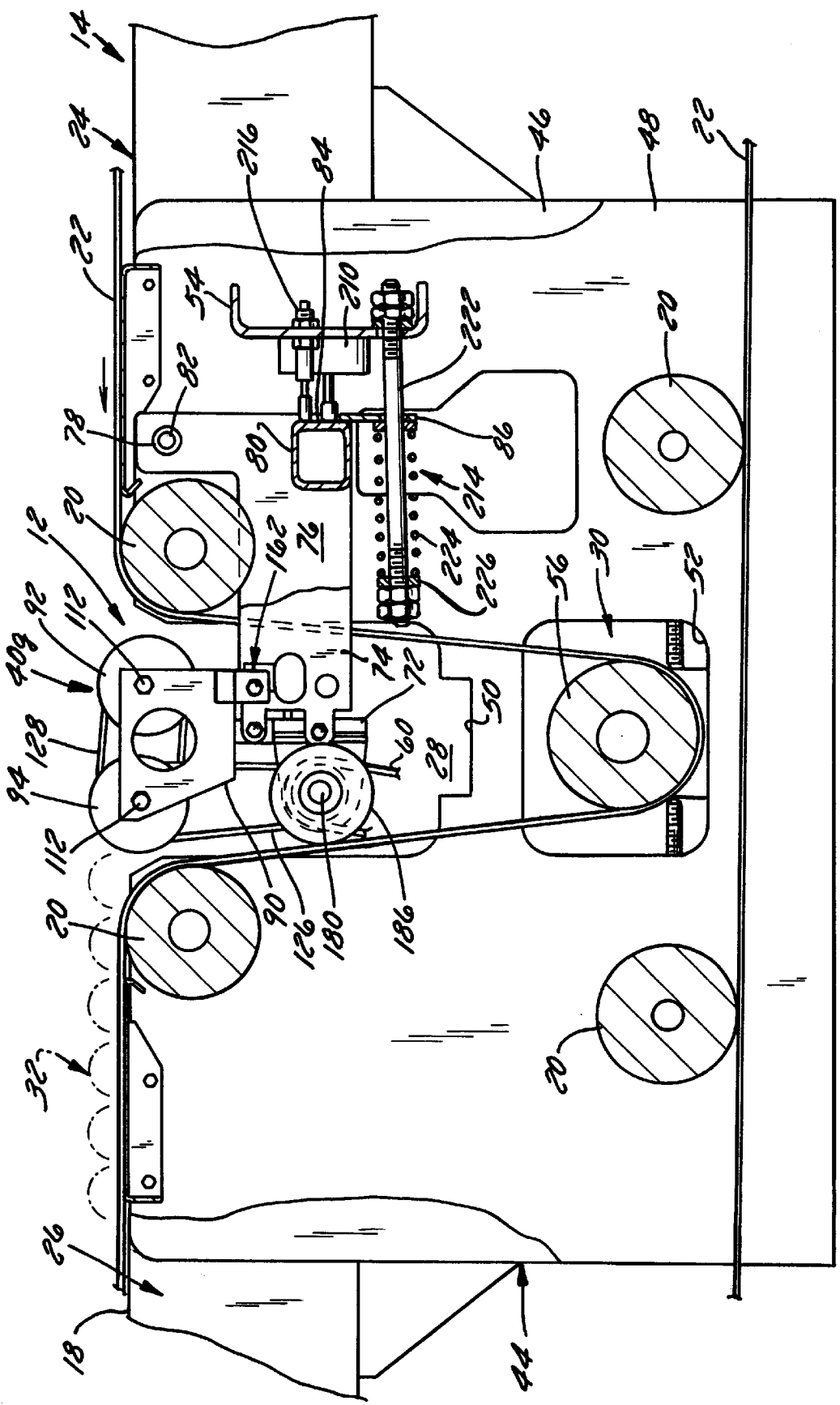
FIG. 3 is a partially sectional side elevation view corresponding to FIG. 2 and illustrating the carriage in its pivoted or popped-up position.

The primary conveyor 14 could comprise a roller conveyor, a chain conveyor, or any other conveyor that conveys articles along a first or primary conveyance path (hereafter referred to as "in-line" conveyance). The illustrated conveyor 14 is a belt-type conveyor including a frame 18 which supports a plurality of rollers 20 for supporting and driving an endless belt 22. As best seen in FIGS. 2 and 3, the primary conveyor 14 is separated into adjacent upstream and downstream or front and rear conveyor sections 24 and 26 having an opening 28 formed therebetween in which is disposed the diverter 12. A drive pulley arrangement 30 is located within the opening 28 beneath the diverter 12.

The secondary conveyor 16 likewise could comprise any conventional conveyor and even could be replaced with a divert station or any other device or mechanism in which it may be desirable to divert articles from the primary conveyor 14. The illustrated secondary conveyor 16 comprises a combination conveyor including an upstream powered roller conveyor 32 and a downstream belt conveyor 34.

The drive pulley arrangement 30 includes 1) an inner, smaller diameter pulley 56 (see FIG. 3) that is driven by the primary conveyor belt 22, and 2) an outer, larger diameter drive pulley 58 that drives the diverter wheel assemblies 40a–40g (detailed below) via a drive belt 60 and a pair of idler sheaves 62, 64. The drive pulley assembly 30 also preferably drives the roller conveyor 32 of the secondary conveyor 16 to synchronize operation of the diverter 12 with operation of secondary conveyor 16.

The diverter 12 is operable in at least two modes. In its first or in-line mode, it conveys articles A at the in-line speed of the primary conveyor 14 and in a direction in-line with the direction of conveyance of the primary conveyor 14. In its second or divert mode, it lifts or ramps articles A from the plane of conveyance of the primary conveyor 14 and diverts those articles onto the secondary conveyor 16. A third mode also is possible in which the diverter 12 lifts articles from the plane of conveyance of the primary conveyor 14 and diverts them onto a third conveyor (not illustrated) positioned beside the primary conveyor 14 opposite the secondary conveyor 16.

The construction and operation of the diverter 12 will now be detailed.

3. Construction of Diverter

The diverter 12 includes a plurality of diverter wheel assemblies 40a–40g each operable in at least two modes to effect the above-described first and second modes of diverter operation as best seen in FIGS. 1–8. In the basic or in-line mode, the conveying surfaces of the diverter wheel assemblies 40a–40g are located in the plane of conveyance of the primary conveyor 14 and rotate in-line with the primary conveyor 14. In the second or diverting mode, the diverting wheel assemblies 40a–40g pop-up and swivel so that their conveying surfaces are located above the plane of conveyance of the primary conveyor 14 and are skewed towards the secondary conveyor 16. When the diverter 12 is in its in-line mode of operation, all of its diverter wheels preferably rotate at a uniform velocity generally equal to the in-line velocity of the primary conveyor 14. When the diverter 12 is in its diverting mode of operation, the rotational speeds of the diverter wheels increase progressively on a wheel-by-wheel basis from the inner side of the primary conveyor 14 to the outer side of the primary conveyor 14 to help turn the conveyed articles A towards the secondary conveyor 16. In the illustrated and preferred embodiment, the diverter wheel assemblies 40a–40g are mounted for swiveling motion on a carriage 42 which is in turn mounted for pivoting motion on a stationary frame 44. Each of the subassemblies 40a–40g, 42, and 44 will now be detailed.

Figure 4:
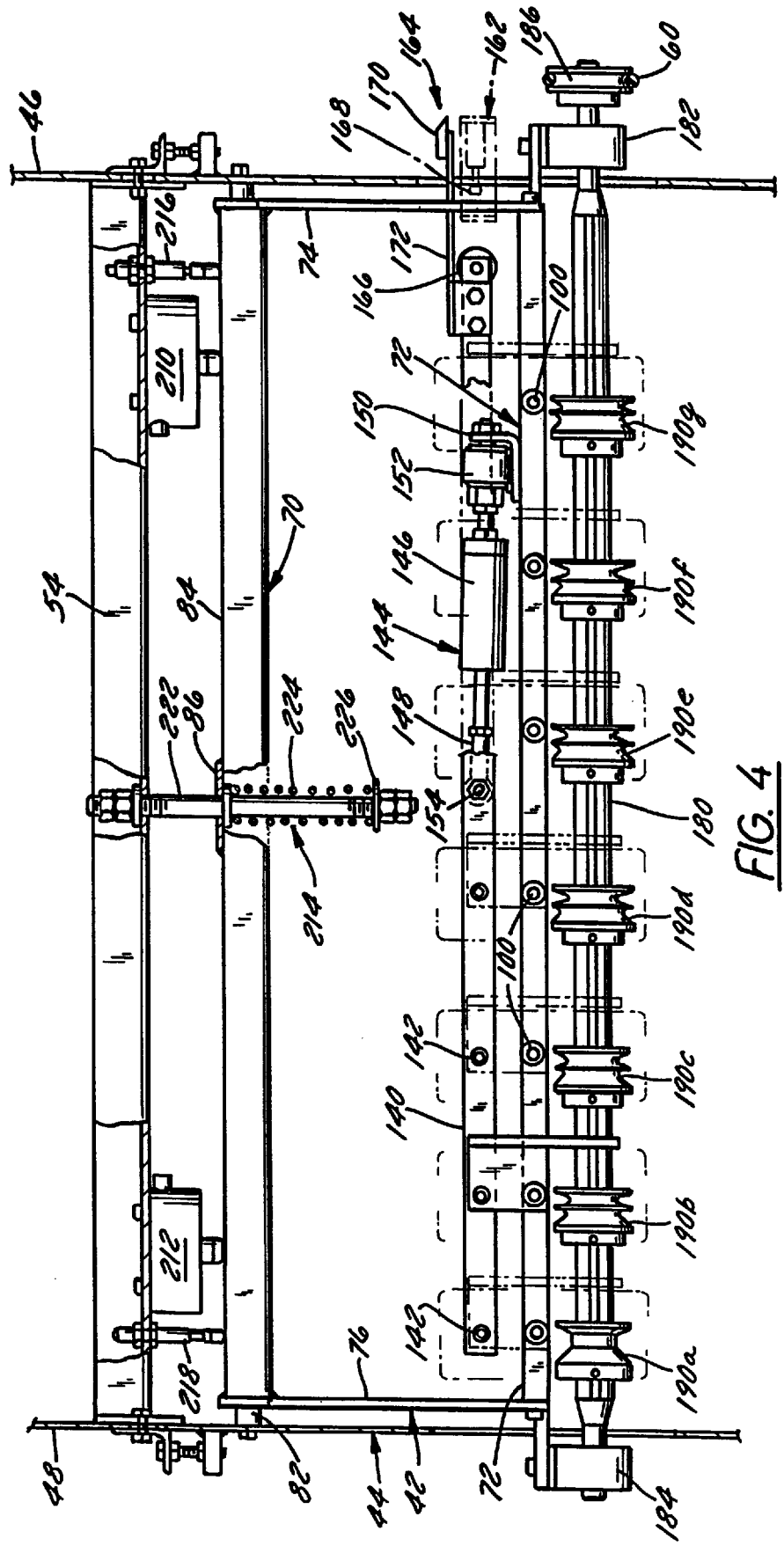
FIG. 4 is a partially cut away top plan view of the diverter.

Referring now to FIGS. 2–4, the stationary frame 44 comprises a pair of laterally-spaced, longitudinally extending metal plate assemblies 46. 48 each of which is bolted or otherwise attached to longitudinal ends of adjacent lateral sections of the primary conveyor frame 18. A relatively large notch 50 is formed in the upper central portion of each plate 46, 48 to accommodate pulleys and other structures of the diverter 12 that extend laterally beyond the vertical plane of the: plates 46 and 48 and that move upon carriage movement. Another, generally rectangular opening 52 is formed in each plate 46, 48 beneath this notch 50 to accommodate the drive pulley arrangement 30. A cross brace 54 extends laterally between the plates 46 and 48 just downstream of the upstream conveyor section 24 to form a support for pivot cylinders 210 and 212 and related structures (detailed below).

Referring now to FIGS. 3–8, the carriage 42 includes a front pivot bar assembly 70 and a rear diverter wheel assembly support frame 72.

The pivot bar assembly 70 includes an upper tube 78 and a lower brace 80 both of which extend most of the length of the diverter 12 laterally with respect to the primary conveyor 14. The upper tube 78 is pivotably or rotatably mounted on a shaft 82 that in turn is fixed at its opposite ends to side plates 46 and 48 of the stationary frame 44. The lower brace 80 is fixed at its opposite ends to the L-shaped plates 74, 76 and is formed from four interconnected plates the front plate of which forms a forward-facing strike plate 84. Strike plate 84 is engaged by pivot cylinders 210 and 212 and by shock absorbers 216 and 218 (detailed below). A spring support 86, welded to a front central portion of the lower brace 80, extends downwardly for supporting a spring assembly 214 detailed below.

Support frame 72 is rigidly attached to the front pivot bar 70 assembly by a pair of laterally opposed generally L-shaped support arms 74 and 76. Support frame 72 includes a rectangular metal structure bolted at its opposite lateral ends to the L-shaped plates 74 and 76 so as to pivot as a unit with the plates 74 and 76. The support frame 72 supports the diverter wheel assemblies 40a–40g, a drive bar 140, a swivel cylinder 144, and a driven shaft 180 and the associated spools 190a–190g, all detailed below.

Figures 10, 12:
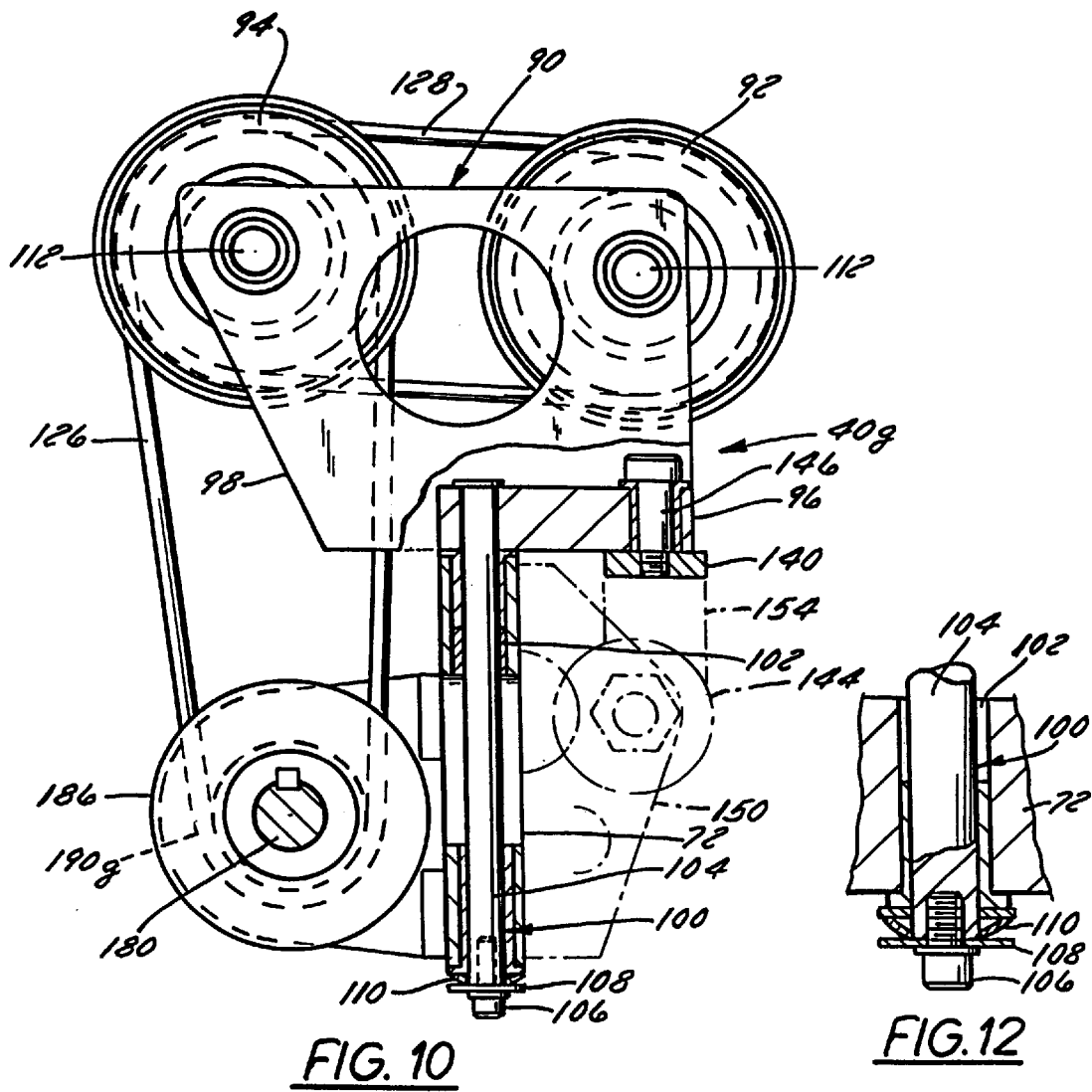
FIG. 10 is a partially cut away end elevation view of one of the diverter wheel assemblies of the diverter.
FIG. 12 is a sectional detail view of a portion of the diverter wheel assembly of FIGS. 10 and 11.

A plurality (seven in the illustrated embodiment) of diverter wheel assemblies 40a–40h are spaced laterally across the support frame 72. All diverter wheel assemblies 40a–40g are identical. Hence, only diverter wheel assembly 40g will be detailed with reference to FIGS. 2–8 and 10–12. Diverter wheel assembly 40g includes a swiveling bracket 90 and at least one, and preferably two, or even more, diverter wheels 92, 94 rotatably mounted on the bracket 90. The bracket 90 includes a lower horizontal plate 96 and an upper plate 98 extending vertically from one lateral side of the horizontal plate 96 (the terms "horizontal" and "vertical" assume a lowered or non-pivoted orientation of the carriage 42, it being understood that these orientations will change upon carriage pivoting). A shank arrangement 100 extends vertically downwardly from the rear portion of the horizontal plate 96 and into the support frame 72 to permit swiveling motion of the bracket 90 relative to the support frame 72. The shank arrangement 100, which extends all of the way through the support frame 72 in order to enhance stability, includes an outer flanged bushing 102 and an inner shank 104. The bushing 102 extends through the support frame 72 and terminates at a bottom surface of the horizontal plate 96. The shank 104 is press-fit to the horizontal plate 96 and extends downwardly through the bushing 102 so as to be guided for rotation within the bushing 102. As best seen in FIGS. 10 and 12, the shank 104 is held in its intended vertical position by a bolt 106, an intervening flat washer 108 and, an intervening wave washer 110. The wave washer 110 imposes a light pressure on the end of the shank 104 to make up for any inconsistencies in the manufacturing process.

In the illustrated and preferred embodiment, two diverter wheels 92 and 94 are rotatably mounted on each swiveling bracket 90 in longitudinal alignment with one another to define front and rear diverter wheels. Providing two diverter wheels 92 and 94 in each diverter wheel assembly facilitates the conveyance of articles along the diverter 12 when the diverter 12 is used in its in-line conveyance mode and helps lift or ramp articles from the plane of conveyance of the primary conveyor 14 when the diverter 12 is in its diverting mode.

Figure 11:
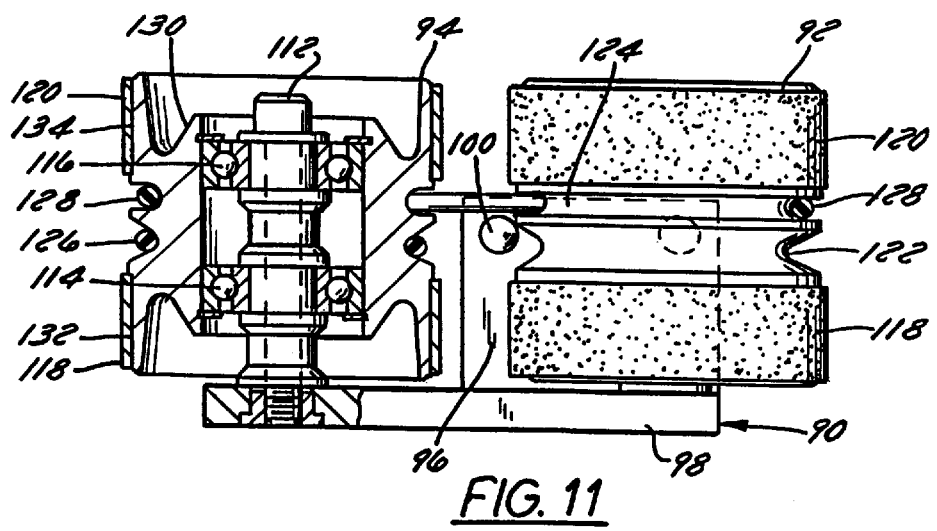
FIG. 11 is a partially cut away top plan view of the diverter wheel assembly of FIG. 10.

Each diverter wheel 92 or 94 is rotatably mounted on the vertical plate 98 of the associated swiveling bracket 90 by a stub shaft 112 and a pair of bearings 114, 116 that extend inwardly from the vertical plate 98 at a right angle best seen in FIGS. 6 and 11. Each diverter wheel 92 or 94 includes two-spaced drive surfaces 118 or 120 that flank a spool having adjacent side-by-side pulley grooves 122 and 124. These grooves 122 and 124 permit the diverter wheels 92 and 94 to be driven in a master and slave arrangement. In the illustrated embodiment in which the rear wheel 94 is the master wheel and the front wheel 92 is the slave wheel, the inner pulley groove 122 of the rear wheel 94 receives a driven O-ring belt 126, and the outer pulley groove 124 receives a second O-ring belt 128 that also rides in the outer pulley groove 124 of the front wheel 92 to impart torque to the front wheel 92.

Referring now to FIGS. 10–12, the outer peripheral surface or drive surface 118 or 120 of each diverter wheel 92 or 94 bears grit to increase friction with conveyed articles A. The grit could be deposited directly on a steel wheel. However, in the illustrated and preferred embodiment, each diverter wheel 92 or 94 instead comprises a metal core 130 having grit-bearing sleeves 132 and 134 mounted on an outer periphery thereof to form the drive surfaces 118 and 120 of the diverter wheel. The core 130 preferably is formed from aluminum to reduce weight. Each sleeve 132 or 134 is formed of steel and is press fit onto the aluminum core 130. Tungsten carbide grit is deposited onto the outer peripheral surface of each sleeve 132 or 134 in the illustrated embodiment. Alternatively, the grit could be replaced with soft urethane treads or the like in applications in which the grit could mar the surfaces of the conveyed articles.

Swiveling motion of the brackets 90 relative to the support frame 72 is made possible by a drive bar 140 that extends across the length of the diverter 12 (laterally with respect to the primary conveyor 14) and that is slidably supported on the support frame 72 in a conventional manner. Each of the diverter wheel assemblies 40a–40g is pivotably coupled to the drive bar 140 by a bolt 142 that extends through a bushing (not shown) in the front end of the horizontal plate 96 and that is threaded into a tapped bore in the drive bar 140 as best seen in FIG. 10.

Longitudinal movement of the drive bar 140, i.e., movement of the drive bar laterally with respect to the primary conveyor 14, is made possible by an actuator that preferably takes the form of a double acting swivel cylinder 144 best seen in FIGS. 6 and 9. The swivel cylinder 144 includes a cylinder end 146 and a rod end 148. The cylinder end 146 is fixed to a support bracket 150 by a floating joint 152. The floating joint 152 permits the cylinder 144 to pivot relative to the support frame 72 and facilitates adjustment of the at-rest position of the cylinder 144 to assure squareness or true in-line orientation of the diverter wheel assemblies 40a–40g when the cylinder 144 is extended. The rod end 148 is pivotably connected to the drive bar 140 by a pivot pin 154. Pressurized air flows to and from the cylinder 144 via a valve assembly 156 and a pair of tubes 158 and 160, best seen in FIG. 9.

In order to control and detect drive bar movement, a shock absorber arrangement 162 and an indicator flag assembly 164 are located adjacent one end of the drive bar 140. The shock absorber arrangement 162 includes 1) a striker wheel 166 mounted on the end of the drive bar 140 and 2) a shock absorber 168 mounted on the end of the support frame 72. The striker wheel 166 engages the shock absorber 168 upon swivel cylinder retraction as seen in FIGS. 5 and 6 to damp motion of the drive bar 140 and hence to prevent undesirable oscillations of the swivel wheel assemblies 40a–40g. The indicator assembly 164 comprises a flag 170 mounted on the end of an L-shaped bracket 172 that is in turn attached to the end of the drive bar 140. Flag 170 interacts with a proximity sensor (not shown) upon swivel cylinder retraction and consequent drive bar motion and diverter wheel assembly swiveling to. provide an electronic indication that swiveling is complete.

Torque is transferred to the diverter wheel assemblies 40a–40g by a diverter wheel drive assembly arranged to permit diverter pop-up and swiveling without excessive belt stretching while simultaneously effecting the above-described speed-change operation. The diverter wheel drive assembly includes a driven shaft 180 and a plurality of spools 190a–190g.

The driven shaft 180 extends across the support frame 72 in parallel with the drive bar 140 and is rotatably mounted on the support frame 72 by bearings 182 and 184 as best seen in FIGS. 7 and 8. Shaft 180 is driven by a driven pulley 186 fixed to an end of the shaft 180 and coupled to the drive pulley 58 by the drive belt 60.

A plurality of driven spools 190a–190g, each of which is associated with a respective diverter wheel assembly 40a–40g, is fixed to the shaft 180 in a spaced-apart relationship so as to be in general vertical alignment with the associated diverter wheel assemblies 40a–40g. The spools 190a–190g function to impart torque to the associated diverter wheel assemblies 40a–40g and to effect the above-described speed changeover upon diverter wheel swiveling. To this end, and as best seen in FIGS. 13–17, at least some of the spools (e.g., spool 40g) have two distinct pulley grooves 192, 194 separated by a flange 196. The pulley grooves 192 and 1.94 of at least most of the spools are of a different diameters so that rotation of the shaft 180 at a designated angular velocity will drive the diverter wheels 92 and 94 of the associated diverter wheel assembly 40g to rotate at a different velocity depending upon the groove 192 or 194 in which the associated driven belt 126 is riding. As best seen in FIGS. 16 and 17, swiveling of a diverter wheel assembly 40g relative to the spool 190g causes the driven belt 126 to twist and to move from one pulley groove 192 to the other pulley groove 194.

Figure 14:
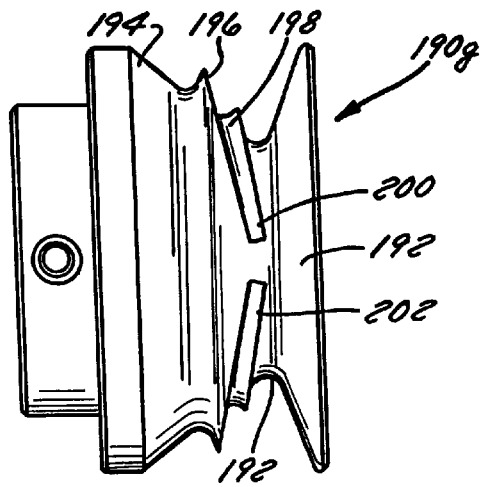
FIG. 14 is a top elevation view of the spool of FIG. 13.
Figure 13:
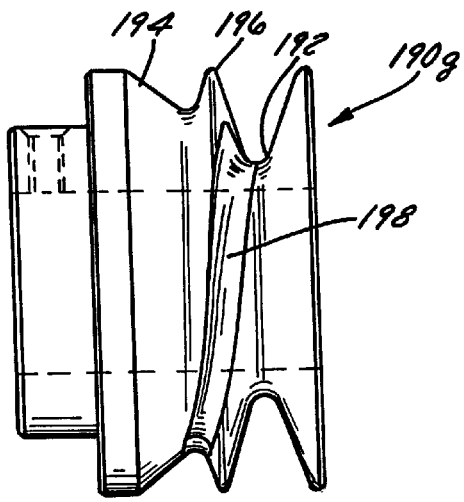
FIG. 13 is a front elevation view of a driven spool forming a portion of a speed change mechanism of the diverter.
Figure 15:
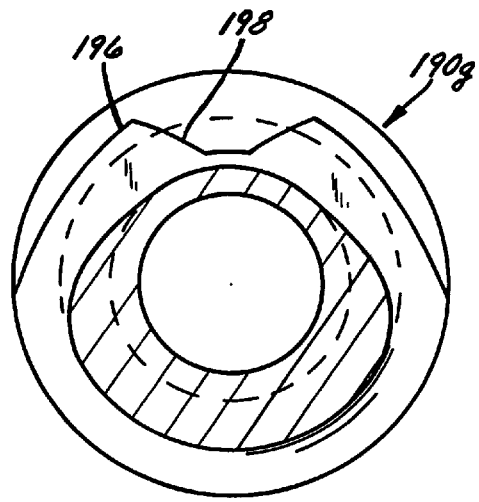
FIG. 15 is a partially cut away outer side elevation view of the spool of FIGS. 13 and 14.

Rapid and consistent belt transfer between the pulley grooves 192 and 194 are important if the diverter wheels 92 and 94 are to effectively turn the article A being diverted. Rapid transfer is especially important in high-speed conveyors which may be traveling at an in-line speed of about 350 feet per minute. Belt transfer should occur in no more than one spool revolution if it is to be effective. Rapid transfer is effected in the illustrated embodiment by a transition mechanism that takes the form of a groove 198 bridging the flange 196 separating the outer and inner pulley grooves 192 and 194. This groove 198 is generally helical in shape so as to generally take the form of a flattened S when viewed in front elevation as seen in FIG. 13. Groove 198 terminates in ends 200 and 202 that are angled towards one another on the rear side of the spool as seen in FIG. 14.

In the preferred and illustrated embodiment, all of the driven belts 126 ride in the associated outer pulley groove 192 when the diverter 12 is operating in its in-line conveyance mode and in the associated inner pulley groove 194 when the diverter 12 is operating in its skewed or diverting mode. All of the outer pulley grooves 192 are of essentially equal diameter to effect rotation of the conveying surfaces of all diverter wheels at the in-line speed of the primary conveyor 14 when the diverter 12 is operating in its in-line conveyance mode. Conversely, the diameters of the inner pulley grooves 194 increase progressively from the spools 190a and 190b at the inner lateral side of the primary conveyor 14 to the spools 190f and 190g at the outer lateral side of the primary conveyor 14. Accordingly, when the diverter 12 is being operated in its diverting mode, the outer diverter wheel assemblies 40f and 40g rotate faster than the inner diverter wheel assemblies 40b and 40a to help turn the articles A towards the secondary conveyor 16. It should be noted that this diameter increase need not begin with the first spool 190a and need not continue all of the way across the width of the primary conveyor 14. Rather, 1) the inner pulley groove 194 of the laterally innermost spools (e.g., spools 190a and/or 190b) could be of the same or even smaller diameter than the outer pulley groove 192 of those spools and/or 2) the inner pulley groove 194 of the laterally outermost spools (e.g., spools 190f and/or 190g) could be of equal diameter to one another.

Vertical motion or "pop-up" of the diverter wheel assemblies 40a–40g is desired to lift the diverted articles A from the plane of conveyance of the primary conveyor 14 during operation in the divert mode so that the diverted articles are not pulled in two directions at once by the diverter wheels 92 and 94 and the primary conveyor belt 22. Pop-up could conceivably be effected by cylinders or some other actuators that lift the carriage 42 vertically. However, in the illustrated and preferred embodiment, pop-up is effected by pivoting the carriage 42 relative to the stationary frame 44. Pivoting is preferred because 1) the connections required are simpler than those required for a vertically-movable arrangement, and 2) carriage pivoting results in a ramped diverter wheel configuration in which the downstream diverter wheel 94 of each diverter wheel assembly is positioned higher than the upstream diverter wheel 92 as best seen in FIG. 3. This ramped configuration helps to lift diverted articles smoothly from the primary conveyor 14 and onto the secondary conveyor 16 without any abrupt height changes.

Carriage pivoting is effected via operation of a pair of pneumatic pivot cylinders 210 and 212 and an associated return spring assembly 214 and shock absorbers or dampers 216 and 218. As best seen in FIGS. 3, 4, and 9, the cylinders 210 and 212 comprise laterally-spaced single-acting pneumatic cylinders supplied with air by the valve assembly 156 and by a tube 220 seen in FIG. 9. Each cylinder 210 or 212 is mounted on the cross brace 54 of the stationary frame 44 and faces the strike plate 84 of the lower cross brace 80. When each cylinder 210 or 212 is extended, it engages the strike plate 84 to cause the carriage 42 to pivot about the pivot shaft 82 and to raise the diverter wheel assemblies 40a–40g. The pivotal movement is stopped by a bumper 228 mounted to the cross brace 80 by an angle clip 229 as seen in FIG. 2.

The die spring assembly 214 resists carriage pivoting and returns the carriage 42 to its lowered position upon pivot cylinder depressurization. The die spring assembly 214 includes a support shaft 222 and a helical compression spring 224 mounted on the support shaft 222. Support shaft 222 is supported at its front end on the cross brace 54 and at an intermediate portion by the spring support 86. The spring 224 surrounds the rear or downstream end portion of the shaft 222 and rests at its front end on the spring support 86 and at is rear end on a spring seat 226.

The shock absorbers 216 and 218 damp carriage return pivoting to prevent carriage oscillation. The shock absorbers 216 and 218 are mounted on the support frame cross brace 54 laterally outside of the pivot cylinders 210 and 212 as best seen in FIG. 4 so as to be engaged by the strike plate 84 of lower cross brace 80 upon return movement of the carriage 42 following a divert operation.

4. Operation of Conveyor Assembly

In operation, articles ranging in weight from approximately 1 lb to 100 lbs, or more, and in size from less than one foot to several feet in length are conveyed along the primary conveyor 14 from right-to-left as seen in FIG. 1 at a relatively high speed of, e.g., approximately 350 feet per minute. When it is desired to operate the diverter 12 in its in-line or non-diverting mode, the pivot cylinders 210 and 212 remain depressurized and the swivel cylinder 144 is maintained in its extended position. Hence, the carriage 42 is maintained in its non-pivoted or lowered position, and each of the diverter wheel assemblies 40a–40g is maintained in its non-skewed and lowered position in which the diverter wheels rotate essentially in-line with the primary conveyor 14 at the primary conveyor's in-line speed. The diverter wheels 92 and 94 of each diverter wheel assembly 40a–40g hence transfer articles along the primary conveyor's conveyance path essentially as if they were part of the primary conveyor 14.

When it is desired to operate the diverter 12 in its divert mode, the valve assembly 156 is activated to simultaneously retract the swivel cylinder 144 and extend the pivot cylinders 210 and 212. Extension of the pivot cylinders 210 and 212 causes the carriage 12 to pivot about shaft 82, against the action of the die spring assembly 214, to raise the diverter wheel assemblies 40a–40g to the position seen in FIG. 3 in which both diverter wheels 92 and 94 of each diverter wheel assembly rise to a location in which their conveying surfaces are positioned above the plane of conveyance of the primary conveyor 14 but in which the downstream or rear diverter wheel 94 is located higher than the upstream or front diverter wheel 92. The total magnitude of the vertical movement of the diverter wheels is relatively small (on the order of ½" to 1"), but is sufficient to achieve the desired effect. A plane connecting the rotational axes of the front and rear diverter wheels therefore extends upwardly and rearwardly with respect to the direction of conveyance of the primary conveyor 14. Carriage assembly pivoting necessarily stretches the O-ring serving as the drive belt 60 coupling the driven pulley 186 to the drive pulley 58. However, this stretching is within acceptable parameters.

Swivel cylinder retraction causes the drive bar 140 to move longitudinally to swivel each of the brackets 90. This swiveling causes the diverter wheels 92 and 94 to take up a skewed position in which they are no longer in-line with the primary conveyor 14 but instead rotate in at least generally the same direction as the secondary conveyor 16. Depending upon the orientation of the secondary conveyor 16 relative to the primary conveyor 14, the magnitude of the swiveling may range from as low as 10° to 20° to as high as 40° to 50° or even more. Diverter wheel assembly swiveling also causes the associated driven belt 126 to twist as best seen in FIG. 17. Twisting of the belt 126 causes it to ride up the helical or generally flattened S-shaped cross-over groove 198 of the associated spool 190g so that the belt 126 crosses the flange 196 and rides on the inner or second pulley groove 194 as seen in FIG. 17. This transition occurs rapidly and assuredly due to the generally helical configuration of the cross-over groove 198 so that the transfer is completed in no more than one revolution of the spool 190g. Once belt transfer is complete, the rotational speed of diverter wheels 92 and 94 of each diverter wheel assembly 40a–40g is increased by an amount proportional to the difference in diameter between the first and second pulley grooves 192 and 194 of the associated spool 190a–190g. Because, as discussed above, the diameters of the second pulley grooves 194 vary from spool-to-spool as one moves laterally across the conveyor 14, the diverter wheels of the laterally outermost diverter wheel assemblies 40f and 40g rotate more rapidly than the diverter wheels of the innermost assemblies 40a–40b. The resulting speed differential helps turn the articles A being diverted onto the secondary conveyor 16.

The driven O-ring belts 126 necessarily stretch when they are twisted during diverter wheel swiveling. If these driven belts also were to stretch upon vertical movement of the diverter wheel assemblies 40a–40g, the amount of stretching might prove excessive so as to result in premature wear and failure of the O-ring belts. However, by mounting the driven spools 190a–190g that drive the belts 126 on the same carriage 42 as the diverter wheel assemblies 40a–406, the entire belt 126 moves with the carriage 42 so that the belt 126 does not stretch during pop-up. The stretching effects due to diverter wheel pop-up and swiveling therefore are distributed between the driven belts 126 and the drive belt 60, thereby reducing the detrimental effects of stretching on any one belt 126 or 60.

When it is desired to resume operation in the in-line mode, the swivel cylinder 144 is extended and the pivot cylinders 210 and 212 are depressurized. Swivel cylinder extension returns the drive bar 140 to its original position thereby to return the diverter wheel assemblies 40a–40g to their in-line orientation to untwist the driven belts 126 and to cause the belts 126 to ride back through the transition grooves 198 and into the first pulley grooves 192 of the associated spools 190a–190g. The diverter wheels 92 and 94 now will once again rotate in-line with the primary conveyor 14 at the in-line speed of the primary conveyor 14. Simultaneous depressurization of the pivot cylinders 210 and 212 causes the carriage 42 to pivot back to its original position under the force of the die spring assembly 214 so that the upper conveying surfaces of the diverter wheels 92 and 94 are once again positioned in the plane of conveyance of the primary conveyor 14.

5. Discussion of Alternative Spool

Figure 18:
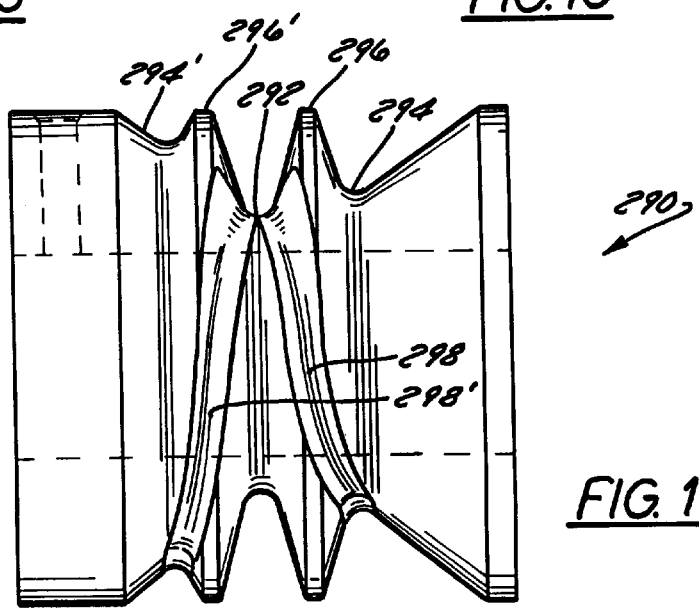
FIG. 18 illustrates a modified driven spool usable to effect bi-directional skewing of a diverter wheel assembly so as to permit articles to be diverted from either side of the conveyor.

As briefly discussed above, the inventive diverter 12 also could be used for bidirectional diverting, i.e. to selectively divert articles either to one side of the primary conveyor 14 or the other. Bi-directional diverting requires no more than increasing the stroke of the drive bar 140 so that the diverter wheels 92 and 94 can swivel to either side of their in-line orientation. It is also preferable, however, to effect the above-described speed change in both diverting directions. A spool 290 that is capable of effecting such a speed change is illustrated in FIG. 18.

Spool 290 incorporates a first or center pulley groove 292 separated by second and third pulley grooves 294 and 294' by flanking flanges 296 and 296'. The first pulley groove 292 corresponds to the first pulley groove 192 of the first embodiment and is designed to drive the O-ring 126 at the in-line speed of the primary conveyor 14 when the diverter 12 operates in its in-line conveyance mode. The second or right pulley groove 294 drives the associated O-ring 126 when the associated diverter wheel assembly is skewed in one direction to divert articles from one side of the primary conveyor 14, and the third or left pulley groove 294' drives the associated O-ring belt 126 when the associated diverter wheel assembly is skewed in the opposite direction to divert articles from the opposite side of the primary conveyor 14. As in the previous embodiment, belt transfer between the grooves 292, 294, and 294' is assisted by changeover grooves 298 and 298'. The only difference of note is that the changeover groove 298 separating the pulley grooves 292 and 294 curves in the opposite direction as the changeover groove 298' separating the pulley grooves 292 and 294'.

The diameters of the second and third pulley grooves 294 and 294' relative to the first pulley groove 292 preferably vary progressively and inversely from spool-to-spool as one moves from one side of the primary conveyor 14 to the other. Hence, at one side of the primary conveyor 14, the second pulley groove 294 will be smaller or generally equal in diameter to the first pulley groove 292, and the third groove 294' will be larger than the first and second pulley grooves 292 and 294. Conversely, at the opposite side of the conveyor 14, the third pulley groove 294' will be smaller or generally equal in diameter to the first pulley groove 292, and the second groove 294 will be larger than the first and third grooves 292 and 294'. This arrangement produces the desired progressive speed change across the width of the conveyor 14 regardless of the lateral direction towards which the articles are being diverted.

Many changes and modifications could be made to the invention without departing from the spirit thereof. The scope of some changes are discussed above. The scope of others will become apparent from the appended claims.

We claim:

1. A conveyor assembly comprising:
  (A) a conveyor having inner and outer lateral sides;
  (B) a diverter for selectively 1) permitting articles to travel along said conveyor without being diverted from said conveyor and 2) diverting articles away from said inner lateral side of said conveyor at an angle, said diverter including
    (1) a plurality of diverter wheel assemblies spaced laterally across said conveyor, each of said diverter wheel assemblies including at least one driven diverter wheel which is capable of swiveling a) from an in-line orientation in which a rotational axis thereof is generally perpendicular to a direction of conveyance of said conveyor b) to a skewed orientation in which said rotational axis thereof is not generally perpendicular to a direction of conveyance of said conveyor and in which said diverter wheel conveys articles away from said inner lateral side of said conveyor at an angle, and
    (2) a speed change mechanism that causes the rotational velocities of at least some of said diverter wheels to vary upon diverter wheel swiveling so that a second diverter wheel positioned laterally outside of a first diverter wheel rotates at generally the same velocity as said first diverter wheel when said first and second diverter wheels are in said in-line orientation thereof and so that said second diverter wheel rotates faster than said first diverter wheel when said first and second diverter wheels are in said skewed orientation thereof.

2. A conveyor assembly as defined in claim 1, wherein said speed change mechanism causes the rotational velocity of a third diverter wheel, positioned laterally outside of said second diverter wheel, to vary so that said third diverter wheel rotates at generally the same velocity as said first and second diverter wheels when said first, second, and third diverter wheels are in said in-line orientation thereof and so that said third diverter wheel rotates faster than said first and second diverter wheels when said first, second, and third diverter wheels are in said skewed orientation thereof.

3. A conveyor assembly as defined in claim 1, wherein
said speed change mechanism comprises first and second driven spools which are coupled to said first and second diverter wheels by first and second driven belts, respectively,
each of said spools has first and second side-by-side pulley grooves, said first pulley grooves of said first and second spools being of essentially equal diameter and said second pulley groove of said second spool being of a larger diameter than a diameter of said second pulley groove of said first spool,
said first and second driven belts each ride in the associated first pulley groove when the associated diverter wheel is in said in-line orientation thereof and in the associated second pulley groove when the associated diverter wheel is in said skewed orientation thereof.

4. A conveyor assembly as defined in claim 3, wherein each of said spools further comprises a transition mechanism which causes the associated driven belt to transfer completely from said first pulley groove to said second pulley groove upon swiveling of the associated diverter wheel, and wherein said transfer is completed in no more than one revolution of said spool.

5. A conveyor assembly as defined in claim 4, wherein each of said transition mechanisms comprises a cross-over groove formed in a flange separating said first and second pulley grooves, said cross-over groove being generally in the shape of a partially-flattened S when viewed in front elevation.

6. A conveyor assembly as defined in claim 3, wherein
each of said diverter wheel assemblies further comprises
1) a swiveling bracket on which said diverter wheel is rotatably mounted so as to define a front diverter wheel, and 2) a rear diverter wheel rotatably mounted on said bracket behind said front diverter wheel substantially in longitudinal alignment with said front diverter wheel,
one of said front and rear diverter wheels of each said diverter wheel assembly comprises a master diverter wheel that is driven by the associated driven belt,
the other of said front and rear diverter wheels of each said diverter wheel assembly comprises a slave diverter wheel that is driven by a slave belt driven by said one diverter wheel.

7. A conveyor assembly as defined in claim 6, further comprising
a common drive bar to which all of said swiveling brackets are pivotably connected, and
an actuator that selectively drives said drive bar to move longitudinally to effect simultaneous swiveling motion of all of said diverter wheel assemblies.

8. A conveyor assembly as defined in claim 7, further comprising a shock absorber that is engaged by said drive bar upon longitudinal movement thereof to damp movement of said drive bar.

9. A conveyor assembly as defined in claim 3, wherein all of said diverter wheel assemblies and all of said spools are mounted on a single carriage, and further comprising a frame on which said carriage is pivotably mounted to permit said diverter wheel assemblies and said spools to be selectively raised and lowered relative to said frame as a unit upon pivotal movement of said carriage relative to said frame.

10. A conveyor assembly as defined in claim 9, further comprising
a driven shaft which is rotatably mounted on said carriage and on which all of said spools are fixedly mounted,
a driven pulley fixedly mounted on said driven shaft,
a drive pulley rotatably mounted on said frame, and
a drive belt coupling said drive pulley to said driven pulley, said drive belt stretching upon pivotal movement of said carriage relative to said frame but not stretching upon diverter wheel assembly swiveling.

11. A conveyor assembly as defined in claim 10, further comprising
a cylinder that is selectively extendable to cause said carriage to pivot relative to said frame, and
a return spring that biases said carriage towards said frame.

12. A conveyor assembly as defined in claim 1, wherein said conveyor comprises a first conveyor, wherein said diverter diverts articles onto a second conveyor extending at an angle from said inner lateral side of said first conveyor, and wherein at least an upstream end portion of said second conveyor is driven by a common drive mechanism driving said diverter wheels.

13. A conveyor assembly comprising:
(A) a conveyor having inner and outer lateral sides and including front and rear longitudinally spaced sections; and
(B) a diverter for selectively 1) permitting articles to travel along said conveyor without being diverted from said conveyor and 2) diverting articles from said inner lateral side of said conveyor at an angle, said diverter including
(1) a stationary frame positioned between said front and rear sections of said conveyor,
(2) a carriage positioned on said frame and being movable with respect to said frame,
(3) a drive pulley rotatably mounted on said stationary frame,
(4) a diverter wheel assembly mounted on said carriage for swiveling motion and rotational motion with respect to said carriage,
(5) a diverter wheel drive assembly mounted on said carriage,
(6) a driven belt coupling said diverter wheel drive assembly to said diverter wheel assembly and stretching as a result of diverter wheel assembly swiveling but not stretching as a result of carriage movement, and
(7) a drive belt coupling said drive pulley to said diverter wheel drive assembly and stretching as a result of carriage movement but not stretching as a result of diverter wheel assembly swiveling.

14. A conveyor assembly as defined in claim 13, wherein
said diverter wheel assembly comprises a bracket mounted on said carriage for swiveling movement with respect to said carriage, and a diverter wheel rotatably mounted on said bracket, and wherein
said diverter wheel drive assembly comprises a driven shaft rotatably mounted on said carriage, a driven pulley fixedly mounted on said driven shaft and coupled to said drive pulley by said drive belt, and a driven spool fixedly mounted on said driven shaft and coupled to said diverter wheel by said driven belt.

15. A conveyor assembly as defined in claim 14, wherein said diverter wheel assembly comprises a first diverter wheel assembly, said spool comprises a first spool, and said driven belt comprises a first driven belt, and further comprising 1) additional diverter wheel assemblies mounted on said carriage in a laterally spaced-apart relationship with respect to said first diverter wheel assembly, 2) additional spools fixedly mounted on said driven shaft in a laterally spaced-apart relationship with respect to said first spool, and 3) additional driven belts, each of which couples one of said additional spools to one of said additional diverter wheel assemblies.

16. A conveyor assembly as defined in claim 14, wherein 1) said diverter wheel is rotatably mounted on said bracket so as to define a front diverter wheel, 2) a rear diverter wheel is rotatably mounted on said bracket behind said front diverter wheel substantially in longitudinal alignment with said front diverter wheel, 3) said carriage is pivotably mounted on said frame, and 4) said rear diverter wheel rises more than said front diverter wheel upon pivoting of said carriage relative to said frame.

17. A conveyor assembly as defined in claim 13, further comprising
  a cylinder that is selectively extendable to cause said carriage to pivot relative to said frame, and
  a return spring that biases said carriage towards said frame.

18. A conveyor assembly as defined in claim 13, wherein said conveyor comprises a first conveyor, wherein said diverter diverts articles onto a second conveyor extending at an angle from said inner lateral side of said first conveyor, and wherein at least an upstream end portion of said second conveyor is driven by. said drive pulley.

19. A conveyor assembly comprising:
  (A) a conveyor having inner and outer lateral sides;
  (B) a diverter for selectively 1) permitting articles to travel along said conveyor without being diverted from said conveyor and 2) diverting articles from said inner lateral side of said conveyor at an angle, said diverter including a support structure and a plurality of diverter wheel assemblies mounted on said support structure so as to be spaced laterally across said conveyor, each of said diverter wheel assemblies including
    (1) a swiveling bracket which is mounted on said support structure for swiveling motion with respect thereto,
    (2) a front diverter wheel rotatably mounted on said bracket, and
    (3) a rear diverter wheel rotatably mounted on said bracket behind said front diverter wheel substantially in longitudinal alignment with said front diverter wheel; and
  (C) a speed change mechanism that causes the rotational velocities of at least some of said front and rear diverter wheels to vary upon swiveling bracket swiveling so that a (1) second diverter wheel positioned laterally outside of a first diverter wheel rotates at generally the same velocity as said first diverter wheel when said first and second diverter wheels are in an in-line orientation thereof, and (2) said second diverter wheel rotates faster than said first diverter wheel when said first and second diverter wheels are in a skewed orientation thereof.

20. A conveyor assembly as defined in claim 19, wherein said speed change mechanism comprises first and second driven spools which are coupled to said first and second diverter wheels by first and second driven belts, respectively,
  each of said spools has first and second side-by-side pulley grooves, said first pulley grooves of said first and second spools being of essentially equal diameter and said second pulley groove of said second spool being of a larger diameter than a diameter of said second pulley groove of said first spool,
  said first and second driven belts each ride in the associated first pulley groove when the associated diverter wheel is in said in-line orientation thereof and in the associated second pulley groove when the associated diverter wheel is in said skewed orientation thereof.

21. A diverter wheel assembly comprising:
  (A) at least one driven diverter wheel which is capable of swiveling from an in-line orientation to a skewed orientation, and
  (B) a speed change mechanism that causes the rotational velocity of said diverter wheel to vary upon diverter wheel swiveling, said speed change mechanism comprising a spool which transmits torque to said respective diverter wheel through a driven belt, said spool having first and second distinct pulley grooves, said second pulley groove being of a larger diameter than said first pulley groove, said driven belt riding in said first pulley groove when said diverter wheel is in said in-line orientation thereof and in said second pulley groove when said diverter wheel is in said skewed orientation thereof.

22. A diverter wheel assembly as defined in claim 21, wherein said spool further comprises a transition mechanism which causes said driven belt to transfer completely from said first pulley groove to said second pulley groove upon swiveling of said diverter wheel, and wherein said transfer is completed in no more than one revolution of said spool.

23. A diverter wheel assembly as defined in claim 22, wherein said transition mechanism comprises a cross-over groove formed in a flange separating said first and second pulley grooves.

24. A diverter wheel assembly as defined in claim 23, wherein said cross-over groove is generally in the shape of a partially-flattened S when viewed in front elevation.

25. A diverter wheel assembly as defined in claim 21, further comprising a swiveling bracket on which said diverter wheel is rotatably mounted so as to define a front diverter wheel, and 2) a rear diverter wheel rotatably mounted on said bracket behind said front diverter wheel and in substantial longitudinal alignment with said front diverter wheel, one of said front and rear diverter wheels comprising a master diverter wheel that is driven by said driven belt, the other of said front and rear diverter wheels comprising a slave diverter wheel that is driven by a slave belt driven by said one diverter wheel.

26. A diverter wheel assembly as defined in claim 21, wherein said diverter wheel comprises a metal core, a sleeve pressed onto said core, and grit deposited onto an outer peripheral surface of said sleeve.

27. A diverter wheel assembly as defined in claim 21, wherein said spool has a third pulley groove of a different diameter than said first and second pulley grooves, and wherein said first pulley groove is positioned between said second and third pulley grooves, said driven belt riding in said third pulley groove when said diverter wheel is swiveled to a second skewed orientation thereof that is opposite said skewed orientation.

28. A method of selectively diverting articles from a first conveyor to a second conveyor, said first conveyor having inner and outer lateral sides, and said second conveyor extending at an angle from said inner lateral side of said first conveyor, a plurality of driven diverter wheels being spaced laterally across said first conveyor at a location near said second conveyor, said method comprising:

(A) conveying a first article along said first conveyor without diverting said article onto said second conveyor by engaging a surface of said first article with said diverter wheels, said diverter wheels 1) being in an inline orientation in which said diverter wheels each rotate about an axis that is essentially perpendicular to a direction of conveyance of said first conveyor, and 2) all rotating at essentially the same velocity; then (B) 1) swiveling said diverter wheels to place said diverter wheels in a skewed orientation in which said diverter wheels each rotate about an axis that is not essentially perpendicular to the direction of conveyance of said first conveyor and 2) varying the rotational velocities of at least some of said diverter wheels; and then (C) while said diverter wheels are in their skewed orientation, diverting a second article from said first conveyor to said second conveyor under power of said diverter wheels, wherein a velocity differential amongst said diverter wheels helps turn said second article so that an outer lateral portion of said second article is conveyed faster than an inner lateral portion of said second article as said second article is diverted onto said second conveyor.

29. A method as defined in claim 28, further comprising raising said diverter wheels during said step (B) and lifting said second article above a plane of conveyance of said first conveyor during said step (C).

30. A method as defined in claim 29, wherein all of said diverter wheels are driven by a common driven shaft coupled to said diverter wheels by respective driven belts, said driven shaft is coupled to a drive pulley by a drive belt, said driven belts stretch as a result of diverter wheel swiveling but not as a result of diverter wheel vertical movement, and said drive belt stretches as a result of diverter wheel vertical movement but not as a result of diverter wheel swiveling.

31. A method as defined in claim 28, wherein each of said diverter wheels is driven by a belt which is in turn driven by a respective spool, each of said spools has first and second side-by-side pulley grooves, said first pulley groove of all of said spools being of essentially equal diameter and said second pulley groove of some of said spools being of a larger diameter than diameters of the second pulley grooves of other spools, each of said driven belts rides in the associated first pulley groove during said step (A) and in the associated second pulley groove by the end of said step (B) and during said step (C).

32. A method as defined in claim 31, wherein, during said step (B), each of said driven belts transfers completely from said first pulley groove of the associated spool to said second pulley groove of the associated spool ir no more than one revolution of the associated spool.

33. A method as defined in claim 32, wherein, during said step (B), each of said driven belts traverses a cross-over groove formed in a flange separating said first and second pulley grooves of the associated spool.

34. A method of varying the rotational velocity of a diverter wheel, said diverter wheel being driven to rotate by a belt that is in turn driven by a spool, said method comprising swiveling said diverter wheel to twist said belt, wherein belt twisting causes said belt to transfer from a first pulley groove of said spool to a second distinct pulley groove of said spool which has a different diameter than a diameter of said first pulley groove.

35. A method as defined in claim 34, wherein said belt transfers completely from said first pulley groove to said second pulley groove in no more than one revolution of said spool.

36. A method as defined in claim 35, wherein, as said belt transfers to said second pulley groove from said first pulley groove, said belt traverses a cross-over groove formed in a flange separating said first and second pulley grooves, said cross-over groove being generally in the shape of a partially-flattened S when viewed in front elevation.

37. A method as defined in claim 34, wherein twisting said belt in a first direction causes said belt to transfer from said first pulley groove to said second pulley groove and twisting said belt in a second direction opposite said first direction causes said belt to transfer from said first pulley groove to a third pulley groove positioned laterally beside said first pulley groove.

38. A conveyor assembly comprising:

(A) a conveyor having inner and outer lateral sides;

(B) a diverter for selectively 1) permitting articles to travel along said conveyor without being diverted from said conveyor and 2) diverting articles from said inner lateral side of said conveyor at an angle, said diverter including a support structure and a plurality of diverter wheel assemblies mounted on said support structure so as to be spaced laterally across said conveyor, each of said diverter wheel assemblies including (1) a swiveling bracket which is mounted on said support structure for swiveling motion with respect thereto, (2) a front diverter wheel rotatably mounted on said bracket, and (3) a rear diverter wheel rotatably mounted on said bracket behind said front diverter wheel substantially in longitudinal alignment with said front diverter wheel; and wherein said support structure is pivotable with respect to said conveyor from a lowered position in which a plane connecting rotational axes of said front and rear diverter wheels extends horizontally to a raised position in which said plane extends upwardly and rearwardly with respect to a direction of conveyance of said conveyor.

* * * * *